(12) United States Patent
Vaishnav et al.

(10) Patent No.: US 11,458,932 B2
(45) Date of Patent: Oct. 4, 2022

(54) SENSOR ASSEMBLY WITH CLEANING SYSTEM

(71) Applicant: Ford Global Technologies, LLC, Dearborn, MI (US)

(72) Inventors: Dhaval P. Vaishnav, Canton, MI (US); Yi-Hsin Yen, Canton, MI (US); Syed K. Ali, Dearborn, MI (US); Andre Sykula, Sterling Heights, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 924 days.

(21) Appl. No.: 15/846,000

(22) Filed: Dec. 18, 2017

(65) Prior Publication Data

US 2019/0184942 A1    Jun. 20, 2019

(51) Int. Cl.

| | |
|---|---|
| *B60S 1/08* | (2006.01) |
| *B08B 1/00* | (2006.01) |
| *B08B 1/04* | (2006.01) |
| *B60S 1/56* | (2006.01) |
| *B60S 1/62* | (2006.01) |
| *H04L 67/12* | (2022.01) |
| *B60S 1/52* | (2006.01) |
| *G02B 27/00* | (2006.01) |
| *B60S 1/54* | (2006.01) |
| *G05D 1/00* | (2006.01) |
| *B08B 3/02* | (2006.01) |
| *G01S 17/931* | (2020.01) |

(52) U.S. Cl.
CPC ............ *B60S 1/0848* (2013.01); *B08B 1/006* (2013.01); *B08B 1/04* (2013.01); *B08B 3/024* (2013.01); *B60S 1/528* (2013.01); *B60S 1/54* (2013.01); *B60S 1/544* (2013.01); *B60S 1/56* (2013.01); *B60S 1/566* (2013.01); *B60S 1/62* (2013.01); *G01S 17/931* (2020.01); *G02B 27/0006* (2013.01); *G05D 1/0088* (2013.01); *H04L 67/12* (2013.01)

(58) Field of Classification Search
CPC ..... B60S 1/08; B60S 1/56; B08B 1/00; B08B 1/04; G05D 1/00
USPC ........................................................ 318/580
See application file for complete search history.

(56) References Cited

U.S. PATENT DOCUMENTS

| | | | | |
|---|---|---|---|---|
| 5,853,025 A | * | 12/1998 | Daneshvar | ................ B60S 1/50 239/284.1 |
| 8,776,722 B2 | * | 7/2014 | Andersson | ............ A01J 5/0175 119/14.08 |
| 9,380,190 B2 | * | 6/2016 | Pawlowski | .......... H04N 5/2171 |

(Continued)

FOREIGN PATENT DOCUMENTS

| | | |
|---|---|---|
| CN | 204845880 U | 12/2015 |
| DE | 102014213283 A1 | 1/2016 |

(Continued)

*Primary Examiner* — Eduardo Colon Santana
*Assistant Examiner* — Devon A Joseph
(74) *Attorney, Agent, or Firm* — Frank A. MacKenzie; Bejin Bieneman PLC

(57) ABSTRACT

A sensor assembly includes a cylindrical sensor window defining an axis, and an annular member coupled to the sensor window and rotatable about the axis. The annular member includes a nozzle aimed at the sensor window and oriented at an acute angle from a radial direction toward the axis in a plane orthogonal to the axis.

20 Claims, 8 Drawing Sheets

(56) References Cited

U.S. PATENT DOCUMENTS

| | | | | |
|---|---|---|---|---|
| 9,505,382 | B2* | 11/2016 | Gokan | B60S 1/0848 |
| 10,422,992 | B2* | 9/2019 | Karasik | G03B 17/56 |
| 10,430,833 | B2* | 10/2019 | Newman | G05D 1/0212 |
| 2003/0155001 | A1* | 8/2003 | Hoetzer | B60S 1/0822 |
| | | | | 134/52 |
| 2011/0292212 | A1* | 12/2011 | Tanabe | B05B 1/08 |
| | | | | 348/148 |
| 2014/0036132 | A1* | 2/2014 | Pawlowski | G03B 17/02 |
| | | | | 348/335 |
| 2016/0001330 | A1* | 1/2016 | Romack | B05B 1/08 |
| | | | | 348/148 |
| 2016/0178898 | A1* | 6/2016 | Eineren | H04N 5/2252 |
| | | | | 348/375 |
| 2016/0244028 | A1* | 8/2016 | Wakatsuki | B60S 1/566 |
| 2016/0339875 | A1* | 11/2016 | Ina | B60S 1/522 |
| 2017/0036647 | A1* | 2/2017 | Zhao et al. | B05B 1/04 |
| 2017/0259789 | A1* | 9/2017 | Mcandrew | B60S 1/528 |

FOREIGN PATENT DOCUMENTS

| | | | |
|---|---|---|---|
| EP | 1304583 | A2 | 4/2003 |
| JP | 2005291808 | A | 10/2005 |
| JP | 2015047900 | A | 3/2015 |

* cited by examiner

SENSOR ASSEMBLY WITH CLEANING SYSTEM

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
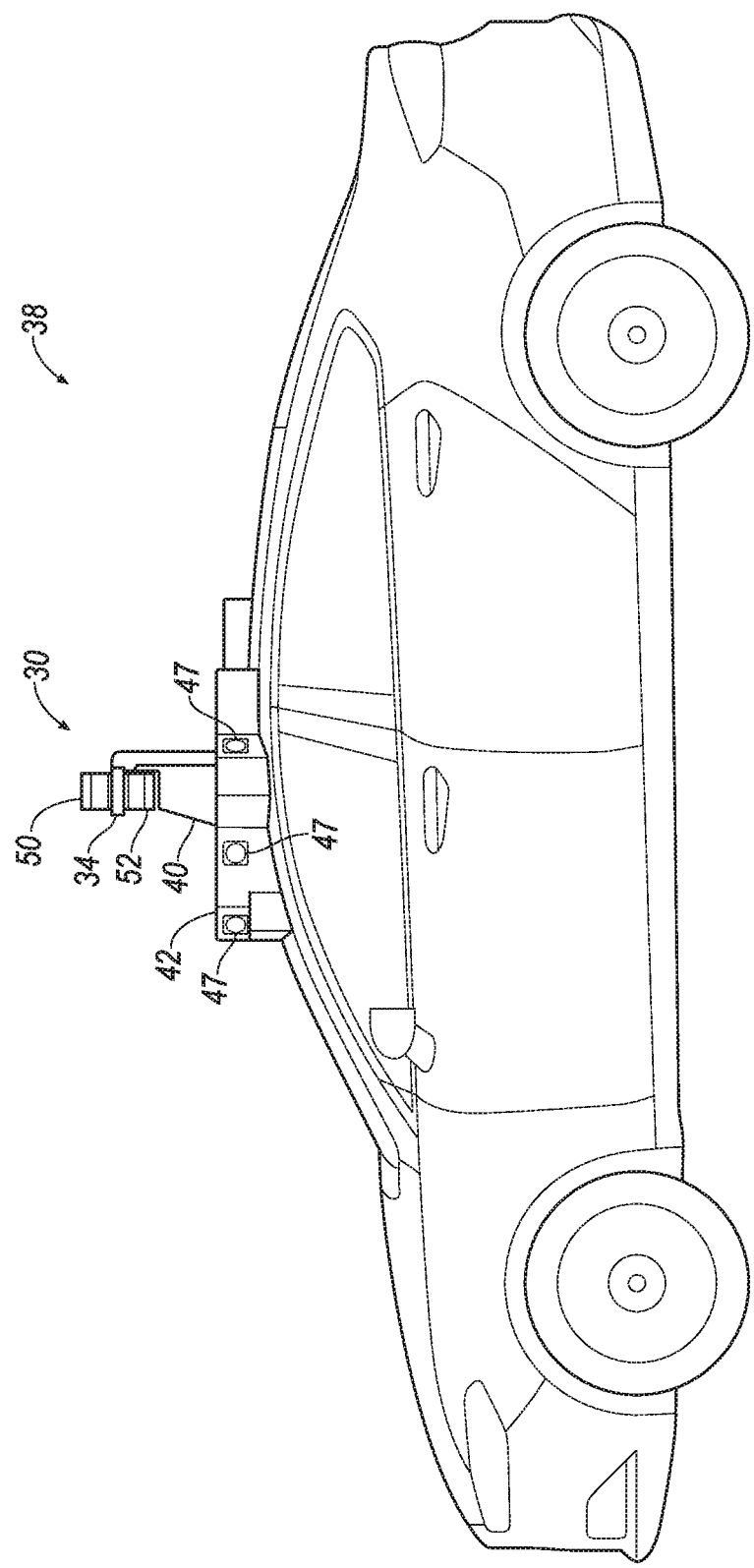
FIG. 1 is a side view of an example vehicle including an example sensor assembly.

A sensor assembly includes a cylindrical sensor window defining an axis, and an annular member coupled to the sensor window and rotatable about the axis. The annular member including a nozzle aimed at the sensor window and oriented at an acute angle from a radial direction toward the axis in a plane orthogonal to the axis.

The nozzle may be a first nozzle, the acute angle may be a first acute angle, and the annular member may include a second nozzle aimed at the sensor window and oriented at a second acute angle from a radial direction toward the axis in a plane orthogonal to the axis.

The sensor assembly may further include a base member fixed relative to the sensor window and about which the annular member extends. The annular member may include an annular-member passage fluidly connected to the nozzle, and the base member may include a base-member passage fluidly connected to the annular-member passage. The base-member passage may be fluidly connected to the annular-member passage for rotational positions continuously for 360° of the annular member relative to the base member.

The annular-member passage may extend about and be partially defined by the base member. The base-member passage may be elongated to an opening connected to the annular-member passage.

The nozzle may be a liquid nozzle, the base-member passage may be a liquid base-member passage, and the base member may include an air nozzle aimed at the sensor window and an air base-member passage separate from the liquid base-member passage. The sensor assembly may further include a pump fluidly connected to the nozzle, and the pump may be sized to produce sufficient pressure for fluid exiting the nozzle to cause the annular member to rotate.

The nozzle may be a liquid nozzle. The sensor assembly may further include a base member fixed relative to the sensor window, and the base member may include an air nozzle aimed at the sensor window. The base member may include a plurality of air nozzles including the air nozzle, and the air nozzles may be circumferentially arranged about the sensor window.

The sensor assembly may further include a mounting bracket connectable to a vehicle, and the sensor window may be fixed relative to the mounting bracket.

The sensor window may be a first sensor window, and the first sensor window may be disposed above the annular member. The sensor assembly may further include a second cylindrical sensor window fixed relative to the first sensor window and disposed below the annular member. The nozzle may be a first nozzle, the acute angle may be a first acute angle, and the annular member may include a second nozzle aimed at the second sensor window and oriented at a second acute angle from a radial direction toward the axis in a plane orthogonal to the axis. The first acute angle may be equal to the second acute angle. The first nozzle may be a first liquid nozzle, the second nozzle may be a second liquid nozzle, and the sensor assembly may further include a base member fixed relative to the first sensor window. The base member may include a first air nozzle aimed at the first sensor window and a second air nozzle aimed at the second sensor window.

The acute angle may be between 15° and 45°.

The annular member may be rotatingly drivable only by fluid exiting the nozzle.

A sensor assembly includes a cylindrical sensor window defining an axis, an annular member coupled to the sensor window and rotatable about the axis, means for washing the sensor window, and means for rotating the annular member about the axis. The means for rotating the annular member about the axis are the same as the means for washing the sensor window.

The sensor assembly may further include means for drying the sensor window.

Figure 3:
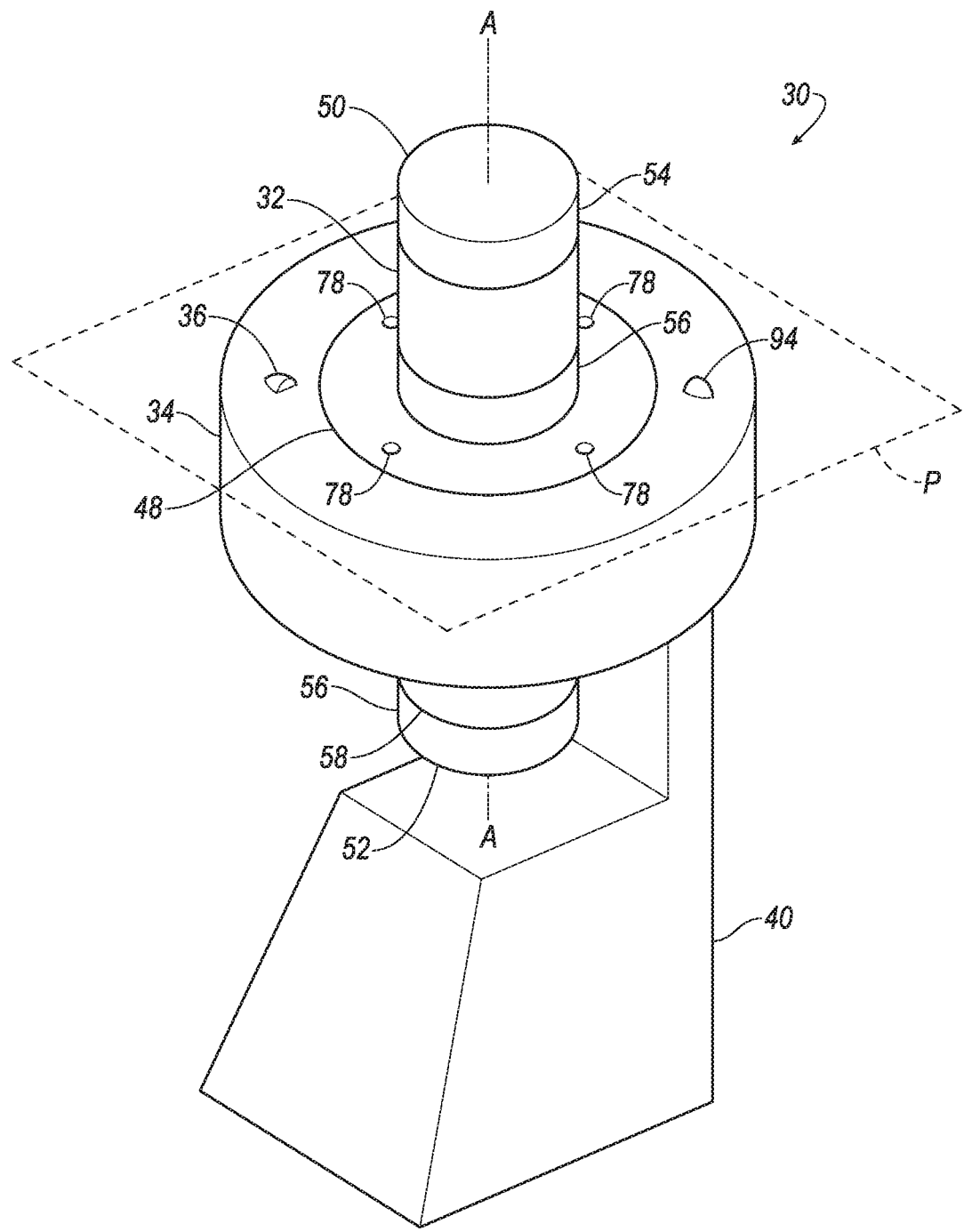
FIG. 3 is a perspective view of the sensor assembly.

As best seen in FIG. 3, a sensor assembly 30 includes a cylindrical first sensor window 32 defining an axis A, and an annular member 34 coupled to the first sensor window 32 and rotatable about the axis A. The annular member 34 includes a first liquid nozzle 36 aimed at the first sensor window 32 and oriented at an acute first angle θ (see FIG. 4) from a radial direction R toward the axis A in a plane P orthogonal to the axis A. (The adjectives "first" and "second" are used throughout this document as identifiers and are not intended to signify importance or order.)

The sensor assembly 30 can provide more complete coverage when cleaning the first sensor window 32 than a system using stationary nozzles. At the same time, the sensor assembly 30 can use fewer first liquid nozzles 36 than a system using stationary nozzles, which can lower the necessary pressure of the fluid exiting the first liquid nozzles 36, reduce fluid consumption, and lower required power for a pump 86 supplying the first liquid nozzles 36. The sensor assembly 30 can cause the annular member 34 to rotate without using a motor or the like, reducing the complexity and cost of the sensor assembly 30.

Figure 2:
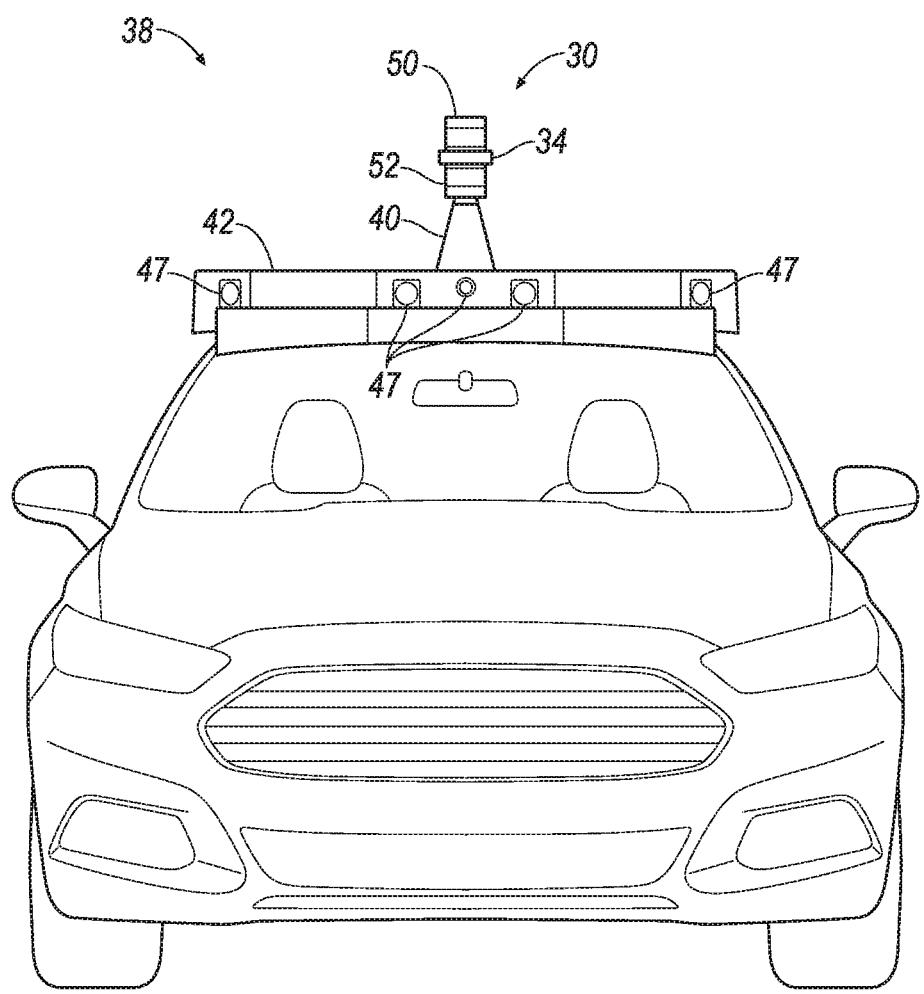
FIG. 2 is a front view of the vehicle including the sensor assembly.

With reference to FIGS. 1 and 2, the sensor assembly 30 is included on a vehicle 38. The vehicle 38 may be an autonomous or semi-autonomous vehicle. A computer (not shown) can be configured to operate the vehicle 38 independently of the intervention of a human driver, completely or to a lesser degree. The computer may be programmed to operate one or more of the propulsion, brake system, steering, and/or other vehicle systems. The vehicle 38 is considered fully autonomous if the computer operates each, i.e., all, of the propulsion, brake system, and steering.

With reference to FIG. 3, the sensor assembly 30 may include a mounting bracket 40 connectable to the vehicle 38. For example, the mounting bracket 40 may be attached to a casing 42 that supports and houses a plurality of sensors 44, 46, 47, as shown in FIGS. 1, 2, 5, and 6. The mounting bracket 40 may be elongated vertically relative to the vehicle 38. The mounting bracket 40 may be a rigid structure that supports the rest of the sensor assembly 30 at a height from the rest of the vehicle 38. The mounting bracket 40 may be integral with, i.e., a single piece with, the casing 42, or the mounting bracket 40 may be a separate piece that is fixedly attached to the casing 42, e.g., via conventional attachment means, such as adhesives, fasteners, snaps, etc.

The sensor assembly 30 includes the sensors 44, 46, 47. The sensors 44, 46, 47 may provide data about operation of the vehicle 38, for example, wheel speed, wheel orientation, and engine and transmission data (e.g., temperature, fuel consumption, etc.). The sensors 44, 46, 47 may detect the location and/or orientation of the vehicle 38. For example, the sensors 44, 46, 47 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 44, 46, 47 may detect the external world, e.g., objects and/or characteristics of surroundings of the vehicle 38, such as other vehicles, road lane markings, traffic lights and/or signs, pedestrians, etc. For example, the sensors 44, 46, 47 may include radar sensors, scanning laser range finders, light detection and ranging (LIDAR) devices, and image processing sensors such as cameras.

A base member 48 is fixed relative to the mounting bracket 40. The base member 48 may be directly or indirectly attached to the mounting bracket 40. The base member 48 may have a cylindrical shape. The base member 48 may have a disc-like shape with a diameter longer than an axial height. The base member 48 may have a groove 104 on an outer periphery of the base member 48.

Figure 5:
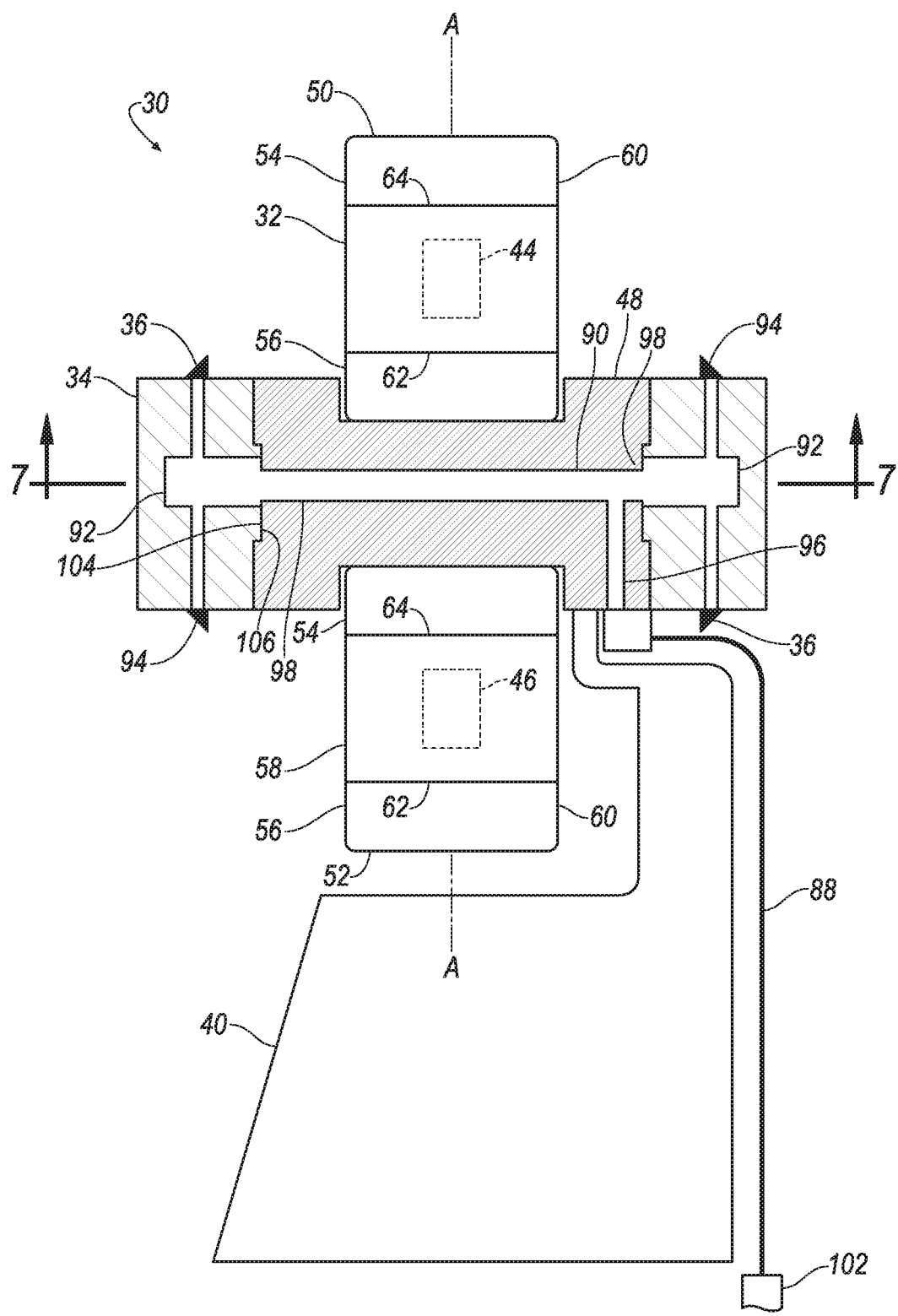
FIG. 5 is a cross-sectional side view of the sensor assembly.
Figure 6:
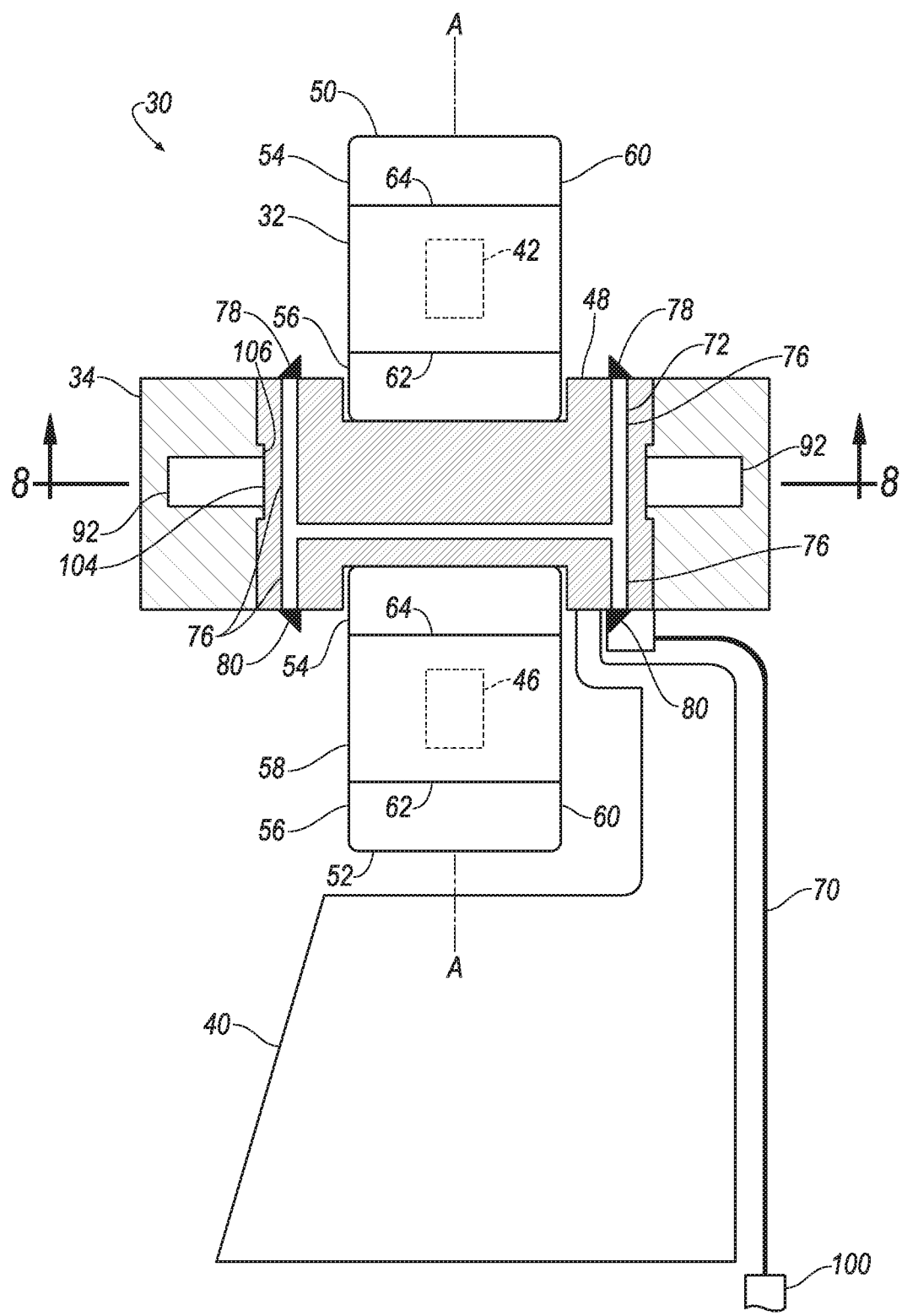
FIG. 6 is another cross-sectional side view of the sensor assembly.

With reference to FIGS. 5 and 6, the sensors 44, 46, 47 may include a first sensor 44 and a second sensor 46. The first and second sensors 44, 46 may be LIDAR devices. A LIDAR device detects distances to objects by emitting laser pulses at a particular wavelength and measuring the time of flight for the pulse to travel to the object and back. The first and second sensors 44, 46 are fixed relative to the mounting bracket 40 and may be attached, directly or via another component, to the mounting bracket 40. The first and second sensors 44, 46 may be positioned along the axis A. The first sensor 44 may be positioned above the second sensor 46. The first sensor 44 may be positioned above the base member 48, and the second sensor 46 may be positioned below the base member 48.

A first housing 50 may encase the first sensor 44, and a second housing 52 may encase the second sensor 46. The housings 50, 52 may each have a cylindrical shape with a top cap 54, a bottom cap 56, and a sensor window 32, 58. The top cap 54 is above, i.e., in a vehicle-upward direction from, the sensor window 32, 58, and the bottom cap 56 is below, i.e., in a vehicle-downward direction from, the sensor window 32, 58. The bottom cap 56 of the first housing 50 and the top cap 54 of the second housing 52 may be attached to the base member 48, and the mounting bracket 40 may support the housings 50, 52 via the base member 48. Each housing 50, 52 has a side surface 60 that includes an outside of the sensor window 32, 58 and circumferentially extending sides of the top cap 54 and the bottom cap 56. The cylindrical shape of the housings 50, 52 defines the axis A, which runs through a center of the housings 50, 52. The axis A is oriented vertically relative to the vehicle 38.

The sensor windows 32, 58 include a first sensor window 32 in the first housing 50 and a second sensor window 58 in the second housing 52. The sensor windows 32, 58 are fixed relative to the mounting bracket 40, such as through the base member 48 and the housings 50, 52. The sensor windows 32, 58 are cylindrical and may also define the axis A. The sensor windows 32, 58 extend about the axis A. The sensor windows 32, 58 may extend fully about the axis A, that is, 360°, or partially about the axis A. The sensor windows 32, 58 extend along the axis A from respective bottom edges 62 to respective top edges 64. The sensor windows 32, 58 have diameters, which may be equal. The diameter of each sensor window 32, 58 may be the same as the rest of the side surface 60 of the respective housing, if any; in other words, the sensor windows 32, 58 may be flush or substantially flush with the side surfaces 60. "Substantially flush" means a seam between the sensor window 32, 58 and the rest of the side surface 60 does not cause turbulence in air flowing along the side surface 60. At least some of each sensor window 32, 58 is transparent with respect to whatever medium the first and second sensors 44, 46 are capable of detecting. For example, if the first and second sensors 44, 46 are LIDAR devices, then the sensor windows 32, 58 are transparent with respect to light at the wavelength generated by lasers of the first and second sensors 44, 46.

The annular member 34 extends circumferentially about the base member 48 relative to the axis A. The annular member 34 is annularly shaped. The first housing 50 and the first sensor window 32 are disposed above the annular member 34, and the second housing 52 and the second sensor window 58 are disposed below the annular member 34. The annular member 34 has an inner diameter and an outer diameter. The inner diameter may be larger than the diameter of the first housing 50 and larger than the diameter of the second housing 52.

The annular member 34 is rotatable about the axis A. The annular member 34 may be rotatably coupled to the base member 48, e.g., via a bearing (not shown) or the like. The annular member 34 is thus rotatably coupled to the sensor windows 32, 58. The annular member 34 may have a projected surface 106 on an inner periphery of the annular member 34. The projected surface 106 may be engageable with the groove 104 of the base member 48. The annular member 34 and the base member 48 may be rotatably engageable via the groove 104 and the projected surface 106. The groove 104 and the projected surface 106 may help the annular member 34 and the base member 48 align with each other. The annular member 34 may be able to rotate relative to the rest of the vehicle 38 while the mounting bracket 40, the base member 48, and the housings 50, 52 remain still relative to the rest of the vehicle 38.

Figure 9:
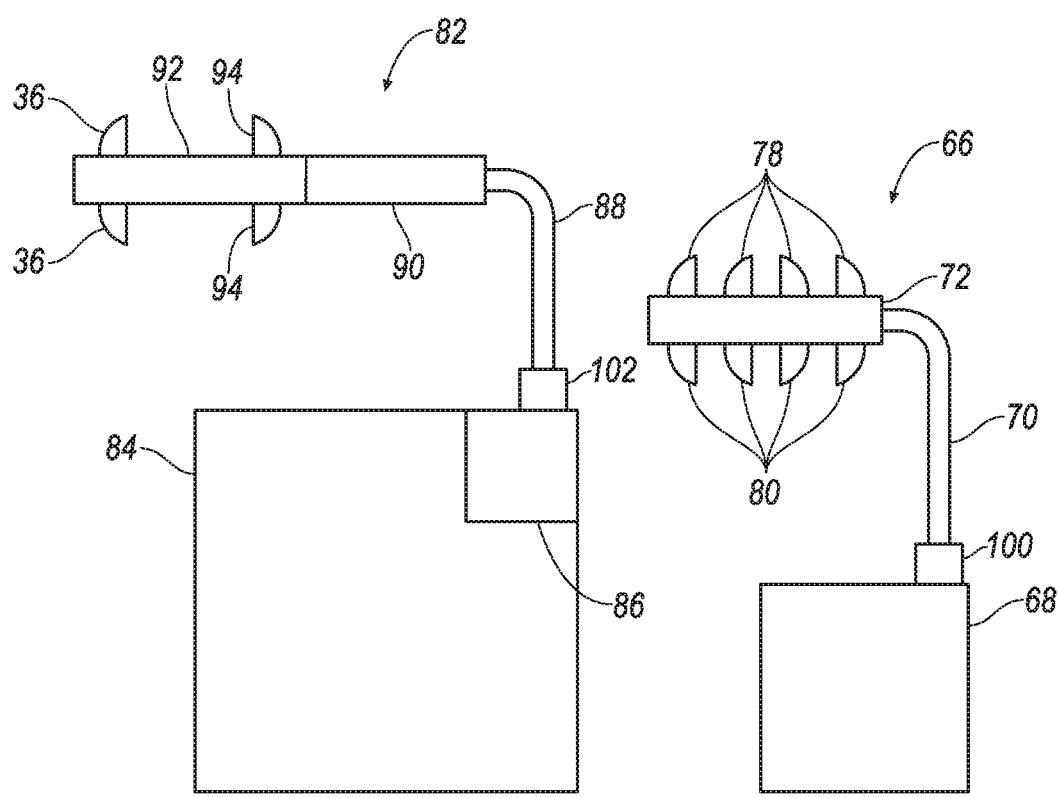
FIG. 9 is a diagram of a cleaning system for the sensor assembly.

With reference to FIG. 9, an air system 66 of the vehicle 38 includes a compressor 68, an air nonreturn valve 100, an air supply line 70, an air base-member passage 72, and air nozzles 78, 80. The compressor 68 and the air nozzles 78, 80 are fluidly connected to each other (i.e., fluid can flow from one to the other) through the air supply line 70 and the air base-member passage 72 in sequence.

The compressor 68 increases the pressure of a gas by reducing a volume of the gas or by forcing additional gas into a constant volume. The compressor 68 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The air nonreturn valve 100 may be located between the compressor 68 and the air supply line 70 or in a middle of the air supply line 70, i.e., spaced from ends of the air supply line 70. The air nonreturn valve 100 may be positioned to prevent airflow through the air supply line 70 away from the base member 48 toward the compressor 68, i.e., to prevent backflow. The air nonreturn valve 100 may be any suitable type of nonreturn valve, e.g., a ball check valve, a diaphragm check valve, a swing check valve, a stop check valve, a lift check valve, an inline check valve, a duckbill valve, a pneumatic nonreturn valve, etc. The air nonreturn valve 100 can improve the response time for supplying airflow through the air nozzles 78, 80 by keeping pressurized air in the air supply line 70 and air base-member passage 72. The air nonreturn valve 100 can improve the modularity of the sensor assembly 30 by allowing the sensor assembly 30 to be detached at the air nonreturn valve 100 from the vehicle 38 and reattached to the vehicle 30.

The air supply line 70 extends from the compressor 68 to the air base-member passage 72. The air supply line 70 may be, e.g., a flexible tube.

Figure 8:
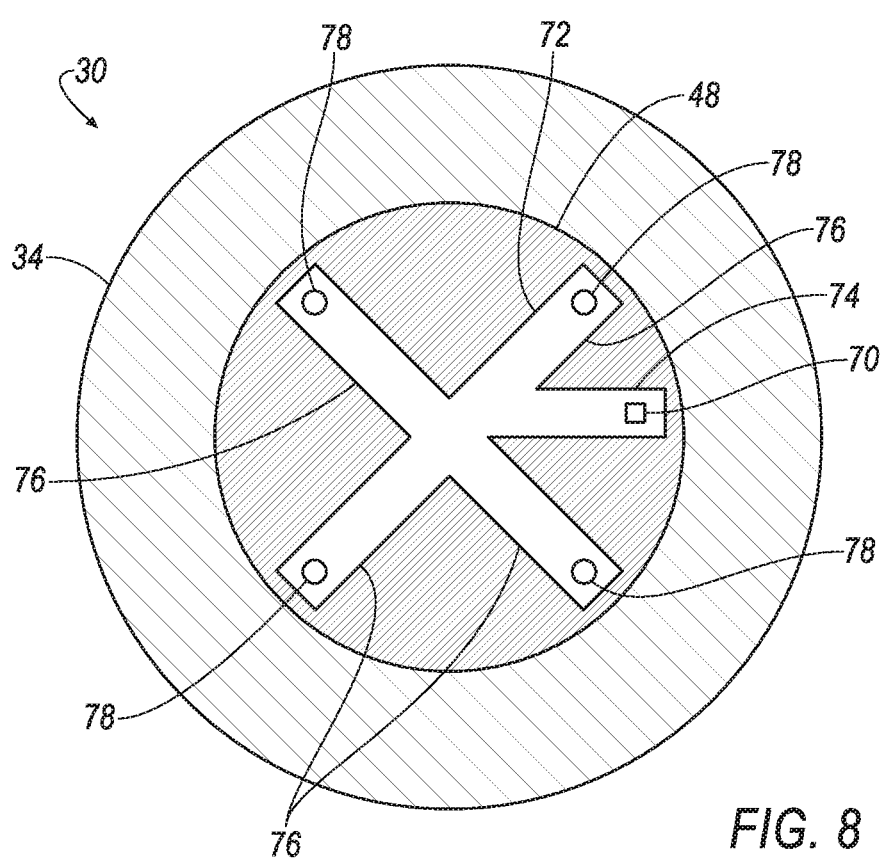
FIG. 8 is another cross-sectional top view of the sensor assembly.

With reference to FIGS. 6 and 8, the base member 48 includes the air base-member passage 72. The air base-member passage 72 is a tube system including an air inlet tube 74 receiving gas from the air supply line 70 and air outlet tubes 76 branching from the air inlet tube 74 to the air nozzles 78, 80. The air outlet tubes 76 may extend horizontally, as best seen in FIG. 8, and then vertically, i.e., up and down, as best seen in FIG. 6. The air base-member passage 72 may be material of the base member 48 defining space for gas to flow.

Figure 4:
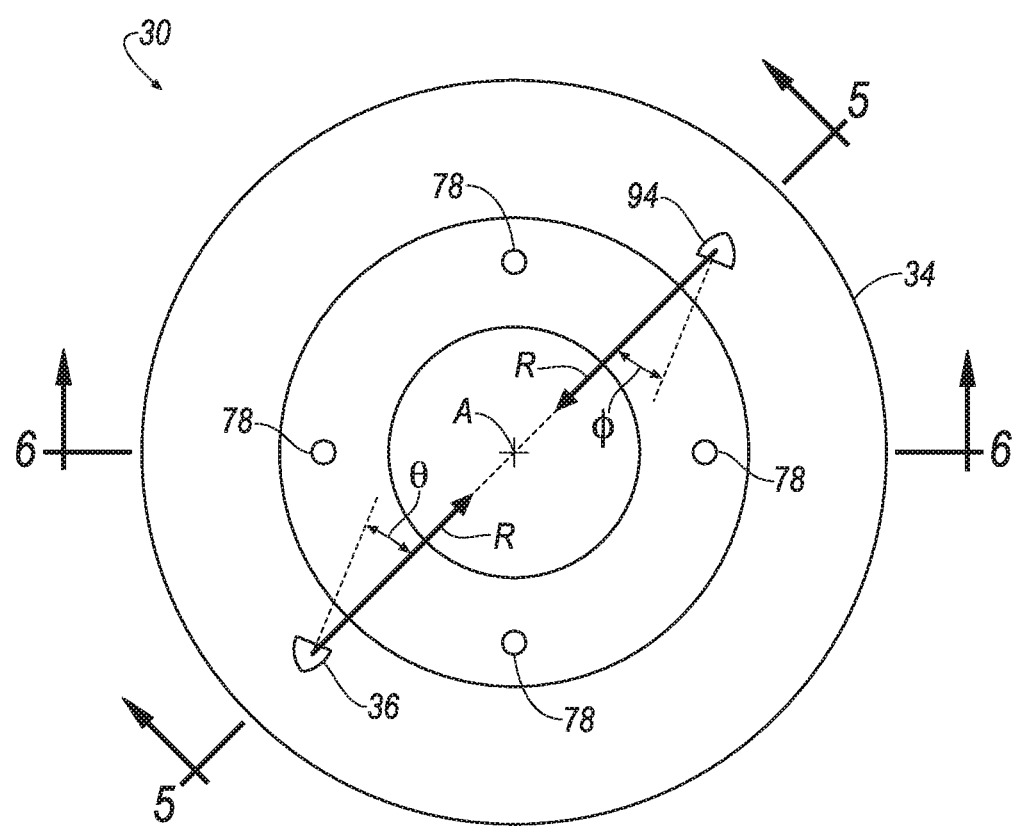
FIG. 4 is a top view of the sensor assembly.

The sensor assembly 30 includes means for drying the sensor windows 32, 58. For example, the base member 48 as illustrated includes a plurality of the air nozzles 78, 80 aimed at one or both of the sensor windows 32, 58. The air nozzles 78, 80 may include one or more first air nozzles 78 aimed at the first sensor window 32 and one or more second air nozzles 80 aimed at the second sensor window 58. The air nozzles 78, 80 are arranged circumferentially about the sensor windows 32, 58. For example, as shown in FIGS. 4, 6, and 8, four first air nozzles 78 are substantially equally spaced at a radius from the axis A and aimed at the first sensor window 32, and four second air nozzles 80 are equally spaced at the radius from the axis A and aimed at the second sensor window 58. Different numbers of air nozzles 78, 80 and different distances from the axis A may be used, e.g., to ensure uniform airflow through all the air nozzles 78, 80.

With reference to FIG. 9, a liquid system 82 of the vehicle 38 includes a reservoir 84, the pump 86, a liquid nonreturn valve 102, a liquid supply line 88, a liquid base-member passage 90, an annular-member passage 92, and the liquid nozzles 36, 94. The reservoir 84, the pump 86, and the liquid nozzles 36, 94 are fluidly connected to each other (i.e., fluid can flow from one to the other) via the liquid supply line 88, the liquid base-member passage 90, and the annular-member passage 92 in sequence. The liquid system 82 distributes washer fluid stored in the reservoir 84 to the liquid nozzles 36, 94. "Washer fluid" in this context refers to any liquid stored in the reservoir 84 for cleaning. The washer fluid may include solvents, detergents, diluents such as water, etc.

The reservoir 84 may be a tank fillable with liquid, e.g., washer fluid for window cleaning. The reservoir 84 may be disposed in a front of the vehicle 38, specifically, in an engine compartment forward of a passenger cabin. The reservoir 84 may store the washer fluid only for supplying the sensor assembly 30 or also for other purposes, such as supply to a windshield.

The pump 86 may force the washer fluid through the liquid supply line 88 to the liquid base-member passage 90 with sufficient pressure that the washer fluid sprays from the liquid nozzles 36, 94. The pump 86 is fluidly connected to the reservoir 84. The pump 86 may be attached to or disposed in the reservoir 84. The pump 86 is sized to produce sufficient pressure for fluid exiting the liquid nozzles 36, 94 to cause the annular member 34 to rotate, as described below.

The liquid nonreturn valve 102 may be located between the pump 86 and the liquid supply line 88 or in a middle of the liquid supply line 88, i.e., spaced from ends of the liquid supply line 88. The liquid nonreturn valve 102 may be positioned to prevent fluid flow through the liquid supply line 88 away from the annular member 34 toward the pump 86, i.e., to prevent backflow. The liquid nonreturn valve 102 may be any suitable type of nonreturn valve, e.g., a ball check valve, a diaphragm check valve, a swing check valve, a stop check valve, a lift check valve, an inline check valve, a duckbill valve, a pneumatic nonreturn valve, etc. The liquid nonreturn valve 102 can improve the response time for supplying fluid through the liquid nozzles 36, 94 by keeping fluid in the liquid supply line 88, the liquid base-member passage 90, and the annular-member passage 92. The liquid nonreturn valve 102 can improve the modularity of the sensor assembly 30 by allowing the sensor assembly 30 to be detached at the liquid nonreturn valve 102 from the vehicle 38 and reattached to the vehicle 30.

The liquid supply line 88 extends from the pump 86 to the liquid base-member passage 90. The liquid supply line 88 may be, e.g., a flexible tube.

Figure 7:
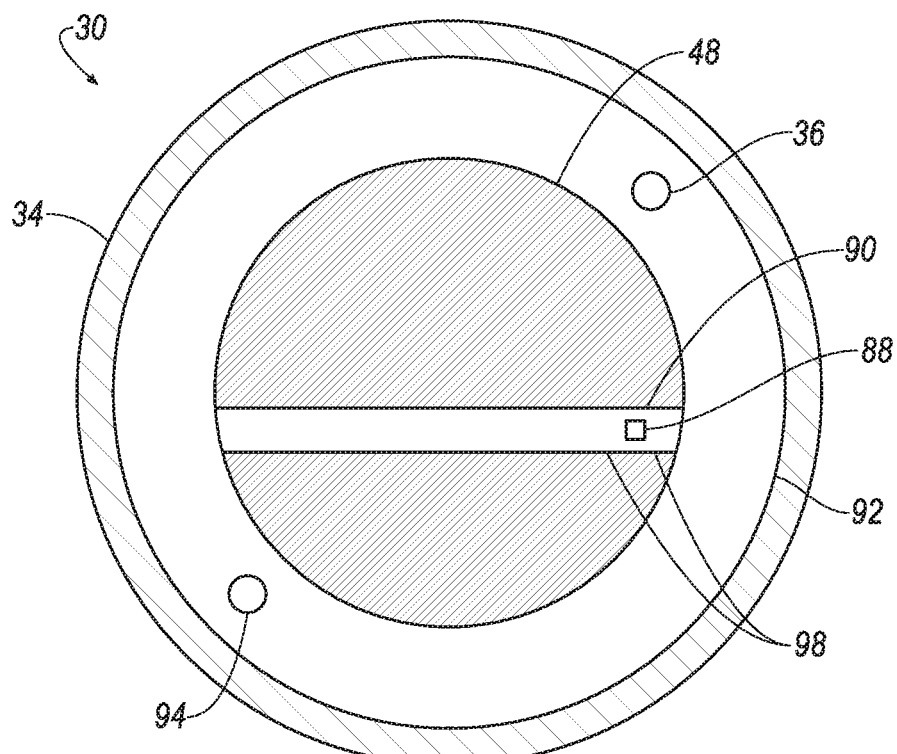
FIG. 7 is a cross-sectional top view of the sensor assembly.

With reference to FIGS. 5 and 7, the base member 48 includes the liquid base-member passage 90. The liquid base-member passage 90 is a tube system including a liquid inlet tube 96 receiving fluid from the liquid supply line 88 and liquid outlet tubes 98 branching from the liquid inlet tube 96 to the annular-member passage 92. The liquid base-member passage 90 may be material of the base member 48 defining space for fluid to flow. The liquid base-member passage 90 is separate from the air base-member passage 72; in other words, the liquid base-member passage 90 and the air base-member passage 72 are not fluidly connected, i.e., material of the base member 48 separates the liquid base-member passage 90 from the air base-member passage 72.

The annular member 34 includes the annular-member passage 92. The annular-member passage 92 is fluidly connected to the liquid base-member passage 90 and to the liquid nozzles 36, 94. The liquid base-member passage 90 is fluidly connected to the annular-member passage 92 for rotational positions continuously for 360° of the annular member 34 relative to the base member 48; in other words, the liquid base-member passage 90 is fluidly connected to the annular-member passage 92 at any position of the annular member 34 as the annular member 34 rotates about the axis A. The annular-member passage 92 extends about and is partially defined by the base member 48. The annular-member passage 92 may be material of the annular member 34 and of the base member 48 defining a space for fluid to flow.

The sensor assembly 30 includes means for washing the sensor windows 32, 58 and means for rotating the annular member 34 about the axis A. The means for rotating the annular member 34 about the axis A are the same as the means for washing the sensor windows 32, 58.

For example, the annular member 34 includes a plurality of the liquid nozzles 36, 94 aimed at one or both of the sensor windows 32, 58. The liquid nozzles 36, 94 are arranged circumferentially about the sensor windows 32, 58. For example, as shown in FIGS. 4, 5, and 7, two liquid nozzles 36, 94 are equally spaced at a radius from the axis A and aimed at the first sensor window 32, and two liquid nozzles 36, 94 are equally spaced at the radius from the axis A and aimed at the second sensor window 58. Different numbers of liquid nozzles 36, 94 and different distances from the axis A may be used; for example, a single liquid nozzle 36 may be aimed at the first sensor window 32, and a single liquid nozzle 36 may be aimed at the second sensor window 58.

With reference to FIG. 4, each liquid nozzle 36, 94 is aimed at one of the sensor windows 32, 58 and oriented at an acute angle from a radial direction R toward the axis A in a plane P orthogonal to the axis A. For the purposes of this disclosure, a radial direction toward an axis means the direction of the shortest distance to the axis. For example, as shown in FIG. 4, a first liquid nozzle 36 may be aimed at the first sensor window 32 and oriented at an angle θ from the radial direction R, and a second liquid nozzle 94 may be aimed at the first sensor window 32 and oriented at an angle φ from the radial direction R. The first and second liquid nozzles 36, 94 may also be oriented upward or downward from the plane P orthogonal to the axis A. The angles θ, φ are acute and may be equal. The angles θ, φ may be between 15° and 45°, resulting in the pressure of the fluid exiting the liquid nozzles 36, 94 causing the annular member 34 to rotate while the fluid exiting the liquid nozzles 36, 94 lands on the sensor windows 32, 58.

In operation, the annular member 34 is rotatingly drivable by fluid exiting the liquid nozzles 36, 94. The pump 86 draws fluid from the reservoir 84 and sends the fluid through the liquid supply line 88, the liquid base-member passage 90, and the annular-member passage 92. The force of the fluid exiting the liquid nozzles 36, 94 pushes the annular member 34 in a circumferential direction opposite the circumferential direction in which the liquid nozzles 36, 94 are aimed, in other words, in a counterclockwise direction as seen in FIG. 4. As the annular member 34 rotates for a complete revolution, the fluid exiting the liquid nozzles 36, 94 lands on 360° of the sensor windows 32, 58. The annular member 34 may be rotatingly drivable only by fluid exiting the liquid nozzles 36, 94; in other words, no motor or the like assists the fluid exiting the liquid nozzles 36, 94 to rotate the annular member 34.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
a cylindrical sensor window defining an axis; and
an annular member coupled to the sensor window and rotatable about the axis, the annular member including a nozzle aimed at the sensor window, the nozzle having a direction of discharge forming an acute angle from a radial direction toward the axis, wherein the acute angle is in a plane orthogonal to the axis.

2. The sensor assembly of claim 1, wherein the nozzle is a first nozzle, the acute angle is a first acute angle, and the annular member includes a second nozzle aimed at the sensor window and oriented at a second acute angle from a radial direction toward the axis in a plane orthogonal to the axis.

3. The sensor assembly of claim 1, further comprising a base member fixed relative to the sensor window and about which the annular member extends, wherein the annular member includes an annular-member passage fluidly connected to the nozzle, and the base member includes a base-member passage fluidly connected to the annular-member passage.

4. The sensor assembly of claim 3, wherein the base-member passage is fluidly connected to the annular-member passage for rotational positions continuously for 360° of the annular member relative to the base member.

5. The sensor assembly of claim 3, wherein the annular-member passage extends about and is partially defined by the base member.

6. The sensor assembly of claim 5, wherein the base-member passage is elongated to an opening connected to the annular-member passage.

7. The sensor assembly of claim 3, wherein the nozzle is a liquid nozzle, the base-member passage is a liquid base-member passage, and the base member includes an air nozzle aimed at the sensor window and an air base-member passage separate from the liquid base-member passage.

8. The sensor assembly of claim 7, further comprising a pump and a compressor, wherein the liquid base-member passage is fluidly connected to the pump, and the air base-member passage is fluidly connected to the compressor.

9. The sensor assembly of claim 1, further comprising a pump fluidly connected to the nozzle, wherein the pump is sized to produce sufficient pressure for fluid exiting the nozzle to cause the annular member to rotate.

10. The sensor assembly of claim 1, wherein the nozzle is a liquid nozzle, the sensor assembly further comprising a base member fixed relative to the sensor window, wherein the base member includes an air nozzle aimed at the sensor window.

11. The sensor assembly of claim 10, wherein the base member includes a plurality of air nozzles including the air nozzle, the air nozzles circumferentially arranged about the sensor window.

12. The sensor assembly of claim 1, further comprising a mounting bracket connectable to a vehicle, wherein the sensor window is fixed relative to the mounting bracket.

13. The sensor assembly of claim 1, wherein the sensor window is a first sensor window, and the first sensor window is disposed above the annular member, the sensor assembly further comprising a second cylindrical sensor window fixed relative to the first sensor window and disposed below the annular member.

14. The sensor assembly of claim 13, wherein the nozzle is a first nozzle, the acute angle is a first acute angle, and the annular member includes a second nozzle aimed at the second sensor window and oriented at a second acute angle from a radial direction toward the axis in a plane orthogonal to the axis.

15. The sensor assembly of claim 14, wherein the first acute angle is equal to the second acute angle.

16. The sensor assembly of claim 14, wherein the first nozzle is a first liquid nozzle, the second nozzle is a second liquid nozzle, the sensor assembly further comprising a base member fixed relative to the first sensor window, wherein the base member includes a first air nozzle aimed at the first sensor window and a second air nozzle aimed at the second sensor window.

17. The sensor assembly of claim 1, wherein the acute angle is between 15° and 45°.

18. A sensor assembly comprising:
a cylindrical sensor window defining an axis;
an annular member coupled to the sensor window and rotatable about the axis;
means for washing the sensor window; and
means for rotating the annular member about the axis, wherein the means for rotating the annular member about the axis are the same as the means for washing the sensor window.

19. The sensor assembly of claim 18, further comprising means for drying the sensor window.

20. A sensor assembly comprising:
a cylindrical sensor window defining an axis; and
an annular member coupled to the sensor window and rotatable about the axis, the annular member including a nozzle aimed at the sensor window, the nozzle having a direction of discharge forming an acute angle from a radial direction toward the axis, wherein the acute angle is in a plane orthogonal to the axis;
wherein the annular member is drivable to rotate around the axis, and the annular member is drivable only by fluid exiting the nozzle.

* * * * *